United States Patent [19]

Ambrosius, III et al.

[11] Patent Number: 4,527,233
[45] Date of Patent: Jul. 2, 1985

[54] ADDRESSABLE BUFFER CIRCUIT WITH ADDRESS INCREMENTER INDEPENDENTLY CLOCKED BY HOST COMPUTER AND EXTERNAL STORAGE DEVICE CONTROLLER

[76] Inventors: William H. Ambrosius, III, 27791 Ruisenor, Mission Viejo, Calif. 92692; Randall Chung, 28192 Bluebell Dr., Laguna Niguel, Calif. 92677

[21] Appl. No.: 401,700

[22] Filed: Jul. 26, 1982

[51] Int. Cl.³ .................. G06F 13/00; G06F 13/04; G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,587,058 | 6/1971 | Butler | 364/200 |
| 4,122,520 | 10/1978 | Adamchick et al. | 364/200 |
| 4,240,138 | 12/1980 | Chauvel | 364/200 |
| 4,371,932 | 2/1983 | Dinwiddie, Jr. et al. | 364/200 |
| 4,399,503 | 8/1983 | Hawley | 364/200 |
| 4,454,595 | 6/1984 | Cage | 364/900 |
| 4,481,578 | 11/1984 | Hughes et al. | 364/200 |

Primary Examiner—Harvey E. Springborn
Assistant Examiner—A. E. Williams, Jr.
Attorney, Agent, or Firm—Spensley, Horn, Jubas & Lubitz

[57] ABSTRACT

A direct buffer access circuit provides a buffer memory for use with a host central processing unit and a peripheral controller for controlling an external data storage device such as a disk or tape drive. The buffer is connected so that both the host and the controller have direct access to the buffer. The host can thus transfer data to the buffer at its own data rate independently of the transfer rate of the controller. The buffer may include either a random access memory which is addressed by a counter, or a first-in/first-out memory. The buffer is controlled by signals received from either the host or the controller.

6 Claims, 1 Drawing Figure

DIRECT BUFFER ACCESS CIRCUIT

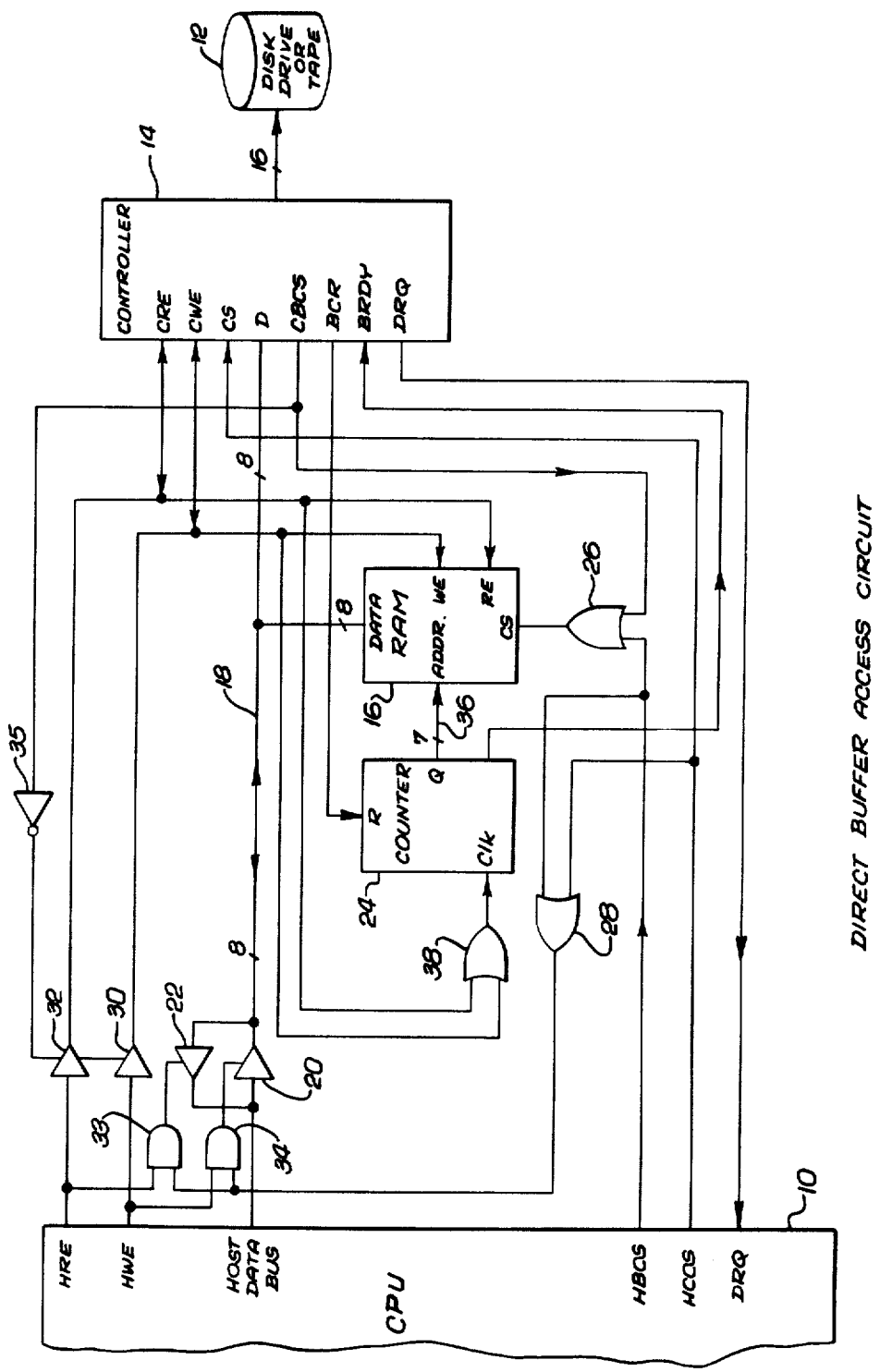

4,527,233

ADDRESSABLE BUFFER CIRCUIT WITH ADDRESS INCREMENTER INDEPENDENTLY CLOCKED BY HOST COMPUTER AND EXTERNAL STORAGE DEVICE CONTROLLER

BACKGROUND OF THE INVENTION

1. Field of the Invention

This invention relates to data processing systems which employ a host computer or central processing unit and an external data source such as a disk drive or tape unit to provide data to the central processing unit. More particularly, this invention relates to data processing systems which include a peripheral controller for controlling the operation of the external data source, including transfer of data to the central processing unit.

2. Description of the Prior Art

The performance of computer systems has been improved by providing peripheral controllers to perform various standard functions in order to off-load input-/ouput processing from the central processing unit ("CPU") to free it for performing more complex operations. Among the most complex controllers are disk controllers, which mate a CPU with a magnetic disk drive data storage unit.

Recent controller systems have included a buffer random access memory (RAM) connected to a controller in order to efficiently receive and store data from the CPU for subsequent transmission to the disk drive or vice versa. However, these prior art systems require that the CPU transmit data to and receive data from the RAM at a rate limited by the processing speed of the controller. The present invention eliminates that limitation, permitting the CPU to transmit data to and receive data from the RAM at the CPU's maximum data transfer rate.

SUMMARY OF THE INVENTION

The present invention provides a data processing system which includes a buffer which is directly coupled to both a CPU and to a peripheral controller. (A DMA controller can be added if desired to enhance CPU-to-buffer data transfer performance). This configuration enables data transfer to be directly controlled by either the peripheral controller or the CPU. By giving the CPU direct control over the buffer, data can be transferred into the buffer at the CPU's data rate.

In one embodiment, the buffer system may consist of a random access memory having a data bus connected to both the CPU and the peripheral controller, and a counter which is used to control the addressing of the random access memory. The clocking of the counter is controlled by signals from either the CPU or the peripheral controller. In an alternate embodiment, a first-in/first-out memory is utilized instead of a counter and RAM.

BRIEF DESCRIPTION OF THE DRAWING

The invention will now be described with reference to the single drawing FIGURE, which is a partial schematic, partial block diagram of the data processing system of the invention.

DESCRIPTION OF THE PREFERRED EMBODIMENT

The following description is of the best presently contemplated mode of carrying out the invention. This description is made for the purpose of illustrating the general principles of the invention and is not to be taken in a limiting sense. The scope of the invention is best determined by reference to the appended claims.

Referring to the drawing FIGURE, a CPU or host computer 10 may be used to perform various computing functions. Data which is utilized by the CPU is stored on an external data storage device 12, which generally is either a disk drive or tape system. For purposes of this description, it will be assumed that the external data storage device 12 is a disk drive unit. A peripheral controller 14 (which, for example, may be a Western Digital model 1010 controller chip) receives control signals from the CPU 10 to control the operation of the disk drive unit 12. The controller 14 controls the disk drive system in order to access appropriate data on the disk, and also controls the actual data transfer to and from the disk. Controllers of this type are well-known in the art and need not be described in detail.

Data which is stored on a disk is typically divided into a number of sectors, with each sector containing a number of bytes (for example, 128 bytes). The buffer RAM 16 of the presently described embodiment is designed to hold one sector's worth of data.

A buffer RAM 16 is connected via an eight-bit wide data bus 18 to the CPU 10 and to the controller 14. Tristate buffers 20 and 22 are located on the data bus 18 to regulate the bi-directional flow of data signals to and from the CPU 10.

Data flow between the RAM 16 and the CPU 10 and the controller 14 is regulated by means of control signals from both the CPU 10 and controller 14 in conjunction with a counter 24. Depending upon the state of various control signals, data may be transferred between the CPU and disk drive unit, between the CPU and the RAM, or between the controller and the RAM.

The CPU 10 provides a host buffer chip select control signal HBCS and a host controller chip select control signal HCCS. The rate of data transfer to and from the CPU 10 is controlled by a host read enable signal HRE and a host write enable signal HWE. The host read enable signal HRE and the host write enable signal HWE are pulsed signals, whose repetition rate is equal to the rate at which the CPU can transmit or receive data over the data bus 18.

The controller 14 similarly provides a pulsed controller read enable signal CRE and controller write enable signal CWE which regulate the data transfer rate when data is to be transferred between the disk drive and the buffer RAM. The repetition rate of the CRE and CWE signals is equal to the rate at which the controller 14 can transmit or receive data over the data bus 18. In present systems, the data transfer rate of the controller is typically less than the data transfer rate of the CPU.

Other control signals may be present between the CPU 10 and the controller 14, as is known in the art. For example, in the present embodiment, a host controller chip select signal HCCS is used by the CPU 10 to enable the controller 14 for purposes of transferring control and data information to the controller 14 over the data bus 18 in a manner well known in the art.

The counter 24 is an eight-bit counter, and in its initialized state its output is a binary zero. The first seven bits of the output of the counter are coupled along an address bus 36 to the address input of the RAM 16. The counter 24 output causes the corresponding memory location of the RAM 16 to be addressed.

The buffer RAM 16 has a read enable input coupled to both the host read enable signal HRE and the controller read enable signal CRE. The buffer RAM 16 also has a write enable input coupled to both the host write enable signal HWE and the controller write enable signal CWE. When the write enable input of the RAM 16 is clocked by a signal pulse, the RAM will accept one byte of data off of the data bus 18 and store the data in the location then being addressed. When the read enable input of the RAM 16 is clocked by a signal pulse, the RAM will access the location then being addressed and transmit the byte of data stored there onto the data bus 18.

The counter 24 may be incremented by one binary count by the receipt, through an OR gate 38, of a read enable or a write enable pulse from either the CPU 10 or the controller 14. The counter 24 is incremented by the rising edge of a clock signal from the OR gate 38. As the counter 24 is incremented, a successive memory location in the RAM 16 is addressed for reading or writing at the next clock cycle. The incrementing process continues with each clock pulse until the counter state is binary "01111111", which causes the one hundred twenty-eighth byte location in the RAM 16 to be addressed (since the zero byte location is also addressable). Upon the occurrence of the next read or write enable signal, the state of the counter will be binary "10000000". The most significant bit of the counter 24 is output as a buffer ready signal BRDY to the controller 14. The BRDY signal indicates that the counter 24 has cycled through its counting range, thus indicating that the buffer RAM 16 is either empty or full of data.

In order to write data from the CPU 10 into the buffer RAM 16, the CPU 10 enables the buffer RAM 16 by activating the host buffer chip select signal HBCS. The HBCS signal is connected to one input of an OR gate 26, whose output is connected to the chip select input of the buffer RAM 16. The HBCS signal also is connected to an input of an OR gate 28. The output of OR gate 28 serves as an enabling signal to two AND gates 33, 34, which are coupled to tristate buffers 20 and 22 on the data bus 18. The host read enable signal HRE is coupled as the second input to AND gate 33, and when activated causes tristate buffer 22 to conduct data signals to the CPU over the data bus 18. The host write enable signal HWE is coupled as the second input to AND gate 34, and when activated causes tristate buffer 20 to conduct data signals from the CPU over the data bus 18. Tristate buffers 30, 32 are provided for the HRE and HWE signal lines, and are controlled by the controller buffer chip select signal CBCS (inverted by inverter 35). The tristate buffers 30, 32 conduct whenever the controller buffer chip select signal CBCS is inactive.

In addition to providing the host buffer chip select signal HBCS, the CPU 10 also provides a disk write command by sending appropriate data information and a disk write command code to the controller 14. The controller 14 responds to a disk write command by generating a buffer counter reset signal BCR to reset the counter 24 to binary zero. The controller 14 then transmits a data request signal DRQ to the CPU 10 which indicates that the CPU can begin writing data into the buffer RAM 16. Writing is then controlled by pulsing the write enable signal HWE from the CPU 10 once for each byte of data to be transferred from the CPU 10 to the buffer RAM 16. (In some CPU architectures, the active HBCS signal is not steady, but is pulsed at the same rate as the HWE or HRE signals. The present invention may be used with either CPU architecture.)

When the counter 24 has cycled through its counting range, thus indicating that the CPU 10 has written a sector's worth of a data into the buffer RAM 16, the counter generates the buffer ready signal BRDY, which indicates to the controller 14 that the buffer RAM is full and that data should be transferred from the buffer RAM to the disk drive 12. At this point, the data request signal DRQ is reset by the controller 14 to indicate to the CPU 10 that the buffer RAM 16 is full. The CPU 10 ceases transmitting data to the buffer RAM 16 while the data request signal DRQ is reset, and the host buffer chip select signal HBCS is deactivated.

The buffer counter reset signal BCR is then generated by the controller 14 to reset the counter 24. The controller generates a controller buffer chip select signal CBCS which enables the buffer RAM 16 through OR gate 26. Data is read by the controller 14 from the buffer RAM 16 by pulsing the controller read enable signal CRE once for each byte of data to be transferred to the disk drive 12. The data is transmitted to the disk drive 12 at the rate of the pulsed read enable signals CRE from the controller 14. After all of the data from the buffer RAM 16 has been transferred to the disk drive 12, the counter 24 generates another buffer ready signal BRDY to the controller 14. The controller then sets the data request line DRQ to indicate to the CPU 10 that additional information can be written into the buffer RAM 16, and the CPU repeats the write cycle.

In order to read data from the disk drive 12 and write it into the buffer RAM 16, the CPU 10 places the controller 14 into a "read" mode by sending appropriate data identification information and a disk read command code to the controller 14 (with the aid of address control lines not shown, but in a manner known in the art). The host buffer chip select signal HBCS is deactivated by the CPU 10, thus deactivating the tristate buffers 20, 22 on the data bus 18. The controller 14 then generates a controller buffer chip select signal CBCS which enables the buffer RAM 16 through OR gate 26. The controller 14 also generates a buffer counter reset signal BCR to reset counter 24 to binary zero. Data is then transferred from the disk drive 12 to the RAM 16 by providing pulsed controller write enable signals CWE from the controller 14 to clock the counter 24, which addresses the RAM 16. After a complete sector of data has been written into the RAM 16, the buffer ready signal BRDY is transmitted from the counter 24 to the controller 14, indicating that the RAM 16 is full and data can be transferred from it to the CPU 10.

After the receipt of the buffer ready signal BRDY indicating that the buffer 16 is full, the controller 14 generates a buffer counter reset signal BCR to reset counter 24 to binary zero, sets the data request signal DRQ, and deactivates the controller buffer chip select signal CBCS. The DRQ signal allows the CPU 10 to retrieve data from the buffer RAM 16. Upon the setting of DRQ, the CPU 10 activates the host buffer chip select signal HBCS and reads data from the buffer RAM 16 by pulsing the host read enable signal HRE. When the buffer RAM is empty, the buffer ready signal BRDY is transmitted to the controller 14, which resets the data request signal DRQ. The reset DRQ signal prevents the CPU 10 from attempting further access to the buffer RAM 16. The controller 14 will continue to retrieve further data from the disk drive 12 for transfer to the buffer RAM 16 so long as the CPU 10 commands that operation.

Thus, in the configuration illustrated, both the CPU unit 10 and the controller 14 have direct access to the buffer RAM 16. As a result, the CPU 10 can transfer data into the buffer RAM at a rate controlled by the CPU. Hence, the disk drive 12 and controller 14 can operate at a rate which is different from the CPU 10, thus increasing the efficiency of the CPU with respect to disk input/output operations.

It should be noted that the buffer circuitry could be incorporated on the same chip as the controller 14. In addition, instead of utilizing a counter and RAM as described, a first-in/first-out memory device (such as the Western Digital model WD 1510 LIFO/FIFO Buffer Register) could be employed to provide the buffer memory. Various other modifications to the invention will be apparent to those skilled in the art.

I claim:

1. A direct buffer access circuit for use in a data processing system having a host computer, an external data storage device for supplying data to the host computer, and a peripheral controller connected between the host computer and data storage device for controlling the operation of the data storage device and transferring data between the host computer and the data storage device, the direct buffer access circuit comprising:

addressable memory means connected to the host computer and to the controller for receiving and storing data from the host computer for subsequent transmission to the storage device via the controller and for receiving and storing data from the storage device via the controller for subsequent transmission to the host computer and for receiving control signals from both the host computer and controller to indicate whether data is to be written into or read out of the memory means;

addressing means coupled to the memory means, the host computer, and the controller for providing an incrementable address signal to the memory means;

wherein the host computer provides first clocking signals to increment the addressing means to control the rate of addressing of the memory means during transfer of data between the host computer and memory means and wherein the controller provides second clocking signals to increment the addressing means to control the rate of addressing of the memory means during transfer of data between the storage device and the memory means.

2. A direct buffer access circuit as in claim 1 wherein the addressing means comprises a sequential counter which is incrementally clocked to change the address signal to the memory means.

3. A direct buffer access circuit as in claim 2 wherein the memory means comprises a random access memory.

4. A direct buffer access circuit as in claim 2 wherein the counter provides an indicator signal after the memory has been completely addressed, said indicator signal indicating that the memory is empty if data was being read from the memory and indicating that the memory means is full if data was being written into the memory means.

5. A direct buffer access circuit as in claim 1 wherein the memory means comprises a first-in/first-out memory.

6. A direct buffer access circuit as in claim 5 wherein the first-in/first-out memory provides an indicator signal after the memory has been completely addressed, said indicator signal indicating that the memory is empty if data was being read from the memory and indicating that the memory means is full if data was being written into the memory means.

* * * * *